Patented June 16, 1953

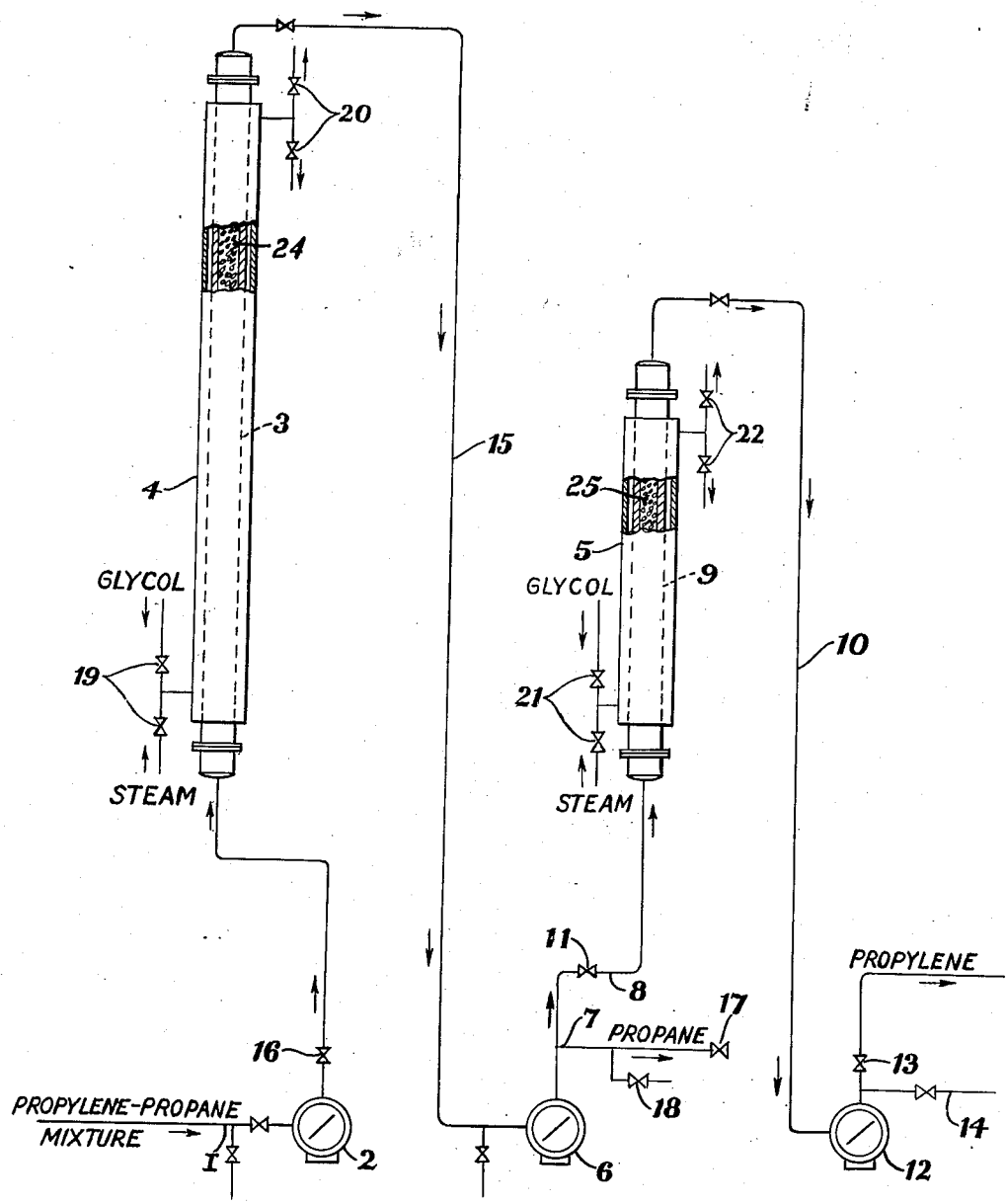

2,642,153

UNITED STATES PATENT OFFICE 2,642,153

GAS SEPARATION BY ADSORPTION AND PREFERENTIAL DESORPTION

William A. Parks, Longview, Tex., assignor to Eastman Kodak Company, Rochester, N. Y., a corporation of New Jersey Application April 2, 1951, Serial No. 218,877

7 Claims. (Cl. 183—114.2)

The present invention relates to an improved method and means for separating olefins and paraffins by adsorption on silica gel. In particular the invention is concerned with the separation of normally gaseous olefins from gaseous paraffins and other gases such as nitrogen, hydrogen, carbon dioxide, carbon monoxide, etc., by adsorption of a gas mixture containing the olefins and some or all of the other components on chilled silica gel and subsequent controlled heating of the silica gel whereby to liberate first the non-olefins and finally the olefins.

It is known that silica gel, as an adsorbent, has a greater preference for olefins than paraffins. This characteristic has been utilized in the past for separation procedures in which passage of an olefin-paraffin mixture through a silica gel bed resulted in removal of the olefin from the mixture by reason of adsorption, the paraffin passing through the bed substantially unadsorbed. However, at any temperature or with the silica gel unsaturated or paritally saturated, there is the difficulty of a certain degree of adsorption of paraffin, e. g., propane. The present invention is based upon the discovery that chilled silica gel will adsorb both paraffins and olefins, but when subsequently heated, will release the paraffin gas at a first relatively low temperature, leaving practically all of the olefin behind. The remaining olefin can then be separated by a second stage of desorption, which will occur at a second and relatively higher temperature.

Accordingly, it is an object of the present invention to provide a method and means for obtaining with an olefin-paraffin-containing mixture a separation of olefins and paraffins which results in products of higher purity than heretofore obtained. It is a further object of the invention to provide a process for separating large quantities of normally gaseous olefins from gaseous paraffins existing in commercial gas mixtures of the two at atmospheric pressure.

Still another object of the invention is the provision of a system employing two adsorbers, namely, a primary adsorber and a secondary adsorber, whereby a cut of gas desorbed from the primary adsorber and containing both paraffins and olefins may be adsorbed for further separation.

It is a still further object of the invention to provide for efficient separation at atmospheric pressure of propylene of high purity in large quantities from a mixture of propylene and propane, for example, to obtain in two stages from a commercial mixture containing 2 to 75 per cent propylene a gas analyzing up to 95 per cent propylene. The method and means for separating propylene and propane is a particularly useful and satisfactory embodiment of the invention.

The invention may be described briefly as follows: A mixture of paraffins and olefins is passed over a chilled bed of silica gel in a primary adsorber wherein the paraffins and olefins are substantially all adsorbed. When all of the mixture has been passed into the adsorbent of the primary adsorber, the bed thereof is gradually warmed to a first relatively low desorption temperature whereby essentially pure paraffin is desorbed and collected. The bed subsequently is further warmed, whereby a paraffin-olefin mixture is desorbed and vented. Additional warming to a still higher temperature results in the liberation of gas comprising a high percentage of olefin which is passed into and adsorbed by a chilled adsorbent bed of silica gel in a secondary adsorber. From the secondary adsorber, after liberation of paraffins therefrom, pure olefin is desorbed and collected upon the application of heat and/or the application of a vacuum.

While the invention will be described herein below in terms of its most advantageous embodiment, e. g., the separation of propylene and propane from gaseous mixtures of the two, it is to be noted that the process and apparatus are applicable to the concentration of propylene from such mixtures containing also gases such as methane, hydrogen, carbon monoxide, carbon dioxide, nitrogen, etc. However, when separation of propylene from a mixture containing one or more of the gases hydrogen, carbon monoxide, carbon dioxide, nitrogen, etc., is to be effected, it generally will be found that only a portion of these latter gases are adsorbed in the primary adsorber, and the fraction adsorbed is liberated in the first fraction on desorption.

The process will function with either wet or dry gases and finds particularly utility in the separation of gases containing a saturating amount of water vapor.

Normally, the separation provides outstanding results using a gaseous feed mixture having a composition of 2–75 percent propylene, the remainder of the gas being propane or ethane, or both. The adsorption may be conducted at about $-10°$ C. to about $30°$ C., with desorption occurring at about $35°$ C. to about $150°$ C. Generally, however, an adsorption range of $-10°$ C. to $20°$ C. is advisable, and the preferred range for most mixtures containing principally propylene and propane is −10° C. to 10° C.

The invention will be understood by referring to the accompanying drawing, in which apparatus comprising a system for practice of the process is schematically illustrated.

With reference to the drawing, a pipe line 1 leads from a storage tank or other source of gas mixture, through a gas meter 2, and thence through a valve 16 into a primary adsorption column 3 containing a fixed bed of silica gel adsorbent 24. A secondary adsorption column 9, also containing a fixed bed of silica gel adsorbent 25, is connected with the primary column 3 by means of pipe line 15, gas meter 6, and pipe line 8, provided with a valve 11. From the secondary column 9, a line 10 leads to a propylene storage tank or other collecting agency (not shown) through gas meter 12, and a valve 13. A valved vent line 14 is disposed between the meter 12 and the valve 13. A branched line 7 disposed between meter 6 and valve 11 communicates with a storage tank or other collecting agency for propane (not shown) through valve 17 and with the atmosphere or a collecting agency through a vent valve 18.

The columns 3 and 9 are provided, respectively, with jackets 4 and 5 adapted to carry heating and cooling fluids such as steam and glycol for controlling the temperature of the adsorbent beds. The heating and cooling fluids are circulated through the jackets by means of appropriately arranged inlet and outlet valve systems 19, 20, 21, and 22, as illustrated.

The gas meters 2, 6, and 12 may be any suitable type of wet or dry meters, and the illustrated arrangement of pipe lines and valves may be changed to conform to any suitable arrangement as desired. Pumps may be inserted in the apparatus if and where desired. Although generally pumps are not required to remove the gases from the gel beds during desorption, it may be suitable to employ a pump to assist in removal of olefin during desorption of the secondary bed.

The silica gel may be of any suitable type, preferably of the specially processed type presently available and capable of withstanding the temperature ranges employed in the process. The gel should be of granular form having a particle size preferably within the range of 4–20 mesh.

The primary adsorption column may be, for instance, 19 feet long, having an iside diameter of 1½ inches, and containing 8,200 cc. of silica gel. A satisfactory secondary column then may be 8 feet long, having an inside diameter of 1½ inches and containing 3,700 cc. of solica gel.

In operation, a gas mixture containing, for instance, 60 percent propylene and 40 percent propane is conducted from line 1 through meter 2 and thus into the adsorber 3 which previously has been cooled to a temperature in the range of −10° to 30° C. by the introduction of cold glycol into the jacket 4. At this temperature, the silica gel adsorbs substantially 100 percent of the gases passed into it. Upon completion of the adsorption phase, the supply of gas mixture to the primary adsorber having been discontinued, and valve 16 having been closed, the primary adsorber is warmed gradually by introducing steam into the jacket 4 until the temperature of the bed reaches about 35° C. to 50° C. This increase in the temperature results in release of propane, which is withdrawn from the primary adsorber column through line 15 and metered through meter 6 and collected through line 7. The collected gas is substantially pure propane. The primary adsorber is further warmed to a higher temperature within the range of about 55° C. to 70° C., and the gas desorbed as a result of this second increase in temperature, being a mixture of propylene and propane, is vented through valve 18. Additional heat is supplied to the primary adsorber, causing continuous increase in the bed temperature thereof, and the gas being vented is analyzed. When the composition of the effluent gas reaches as much as about 70 percent propylene, the effluent is fed to the secondary adsorber 9 by closing valve 18 and opening valve 11.

It may be stated that, as a general rule, the feed to the secondary adsorber must have a minimum propylene concentration of approximately 70 percent if a large effluent of substantially pure propylene is to be obtained by the process of the invention. Where the purity and yield of the final propylene product is not critical, it may therefore be possible to remove from the primary adsorber a first effluent fraction of substantially pure propane, a third effluent fraction of substantially pure propylene, and a second effluent fraction, the second fraction being for further treatment in the secondary adsorber and containing a mixture of propylene and propane with the propylene concentration at a value substantially less than 70 percent. With this latter method, the propylene purity of the effluent from the secondary adsorber would be substantially reduced from the value normally obtainable in operating according to the preferred method. Consequently, it is a valuable feature of the invention that operation in accordance with the criterion whereby feed to the secondary absorber is limited to mixtures containing at least about 70 percent propylene leads to outstanding yields of high purity propylene.

The adsorbent bed in column 9 during the adsorption phase therein, is maintained at a temperature of −10° to 30° C., being cooled with glycol circulated through jacket 5 of the secondary adsorber column. The effluent gas from column 3 is continuously passed through column 9 until the temperature of the bed in column 3 has reached about 150° C., at which time the bed in column 1 has been substantially completely freed of all gas, and the supply of gas to the secondary adsorber is discontinued (valve 11). Thereupon steam is introduced into the jacket of the secondary adsorber column 9 and the temperature thereof raised to about 35° C. or more. At this temperature, gas consisting of substantially pure propane is metered through meter 12 and vented through the vent line 14 (or collected as desired). Upon completion of desorption of propane from column 9, pure propylene subsequently is desorbed therefrom by increasing the temperature of the secondary adsorber to about 150° C. The resulting propylene liberated from column 9 is collected through valve 13. The temperatures of the beds may be measured by suitable means (not shown), and it is also desirable to employ suitable means for indicating temperatures and pressures of the gases. After the beds have cooled sufficiently, the entire operation can be repeated with a second batch of gas, and so on.

Adsorption in the primary adsorber preferably is conducted at a linear velocity of 32 feet per minute, although velocities of 10 to 80 feet per minute can be used. In the secondary adsorber, linear velocities of 10 to 80 feet per minute are satisfactory, but the preferred velocity is 40 feet per minute.

In an actual operation, under the conditions of the above description, contact time in the primary adsorber varied from 0.9 to 2.4 minutes, but it has been determined that a contact time within the range of 0.1 to 4 minutes is satisfactory. In the secondary adsorber, 0.5 to 0.6 minute was used in the example of the above description, although contact times of 0.1 to 4 minutes can be used.

Regarding desorption, linear velocities within the range of 13 to 40 feet per minute are preferred, although satisfactory results may be obtained with velocities in the range of 10 to 80 feet per minute. One cubic foot of silica gel is capable of adsorbing about 20 to 100 cubic feet of propylene-propane mixture, but it appears preferable that the amount be limited within the range of 40–50 cubic feet of mixture per cubic foot of silica gel.

The following examples are illustrative of other results obtained in the practice of the invention, all gas compositions being given in terms of percentage by volume of dry gas.

Example 1

There were 12.3 cubic feet of a gas containing approximately 63.6 percent propylene, 4.6 percent ethane, and 32.6 percent propane, fed to the primary adsorber at a rate of 0.15 cubic foot per minute. The silica gel was maintained at 0° C. The primary adsorber was desorbed by heating to 40° C. to obtain 3.14 cubic feet of 91 percent propane gas. Six cubic feet of gas from the primary adsorber were fed to the secondary adsorber at the rate of 0.23 cubic foot per minute. The secondary adsorber was desorbed by heating to 140° C., after a first fraction had been liberated, to give 4.02 cubic feet of a gas containing 96.5 percent propylene. Thus 71 percent of the propane was recovered as 91 percent propane and 49.5 percent of the propylene was recovered as 96.5 percent propylene. The rest of the propylene and propane was recovered as a mixture comprising approximately 60 percent propylene, 40 percent ethane and propane. There was a contact time of 1.94 minutes in the primary adsorber and 0.57 minute in the secondary adsorber. There were 42 cubic feet of gas mixture treated per cubic foot of silica gel in the primary adsorber and 45.5 cubic feet of gas per cubic foot of silica gel in the secondary adsorber. All gases were measured with a dry meter at a pressure of 14.6 pounds per square inch absolute and a temperature of 70° F.

Example 2

There were 12.4 cubic feet of gas containing approximately 63.6 percent propylene, 4.6 percent ethane, and 32.6 percent propane, fed to the primary adsorber at the rate of 0.175 cubic foot per minute. The adsorber temperature was maintained at −6° C. to 2° C. The primary adsorber was desorbed by heating to 37° C. to obtain 2.8 cubic feet of gas, which was 11.2 percent ethane and 77.8 percent propane. The primary adsorber was further desorbed by heating to 65° C. to obtain a gas 60 percent propylene, 40 percent propane. The primary adsorber was further heated to 140° C. to obtain 6.08 cubic feet of gas. This gas was fed to the secondary adsorber, which was maintained at 5° to 10° C. The secondary adsorber was desorbed by external heating to give 4.43 cubic feet of a gas containing 95.5 percent propylene. The remainder of the gas desorbed was a mixture comprising approximately 60 percent propylene and 40 percent ethane and propane. All gases were measured with a dry meter at a pressure of 14.6 pounds per square inch absolute and a temperature of 70° F. Thus 62 percent of the propane-ethane mixture was recovered as a gas containing 89 percent paraffins and 53 percent of the propylene was recovered as a 95 percent propylene gas. There was a contact time in the primary adsorber of 1.7 minutes and 0.6 minute in the secondary adsorber. The desorption rate was the same rate as that of adsorption.

The invention is not restricted to any particular number of adsorbers, and one, three, or more may be used in the same manner as described in the examples in which two adsorbers were employed. It has been determined, however, that the system described in the foregoing examples is particularly efficient for the concentration of propylene and propane from mixtures comprising the same.

Various suitable means for heating and cooling the silica gel may be employed. However, as is obvious from the foregoing, the means should be susceptible of producing gradual and carefully controlled successive increments of heat whereby to arrive at the suitable successive temperature stages. Further regarding the gas mixture, the invention is not restricted to a feed of the same concentration as that given in the examples, nor is it restricted, as pointed out above, to its embodiment of particular utility, e. g., the separation of propylene from propane, but can be used to separate ethylene and ethane, or an olefin from other gases such as nitrogen, oxygen, hydrogen, carbon monoxide, and carbon dioxide.

It will be appreciated that the specific temperatures, as distinguished from the temperature ranges, for the various adsorption and desorption steps are quite variable in the sense that they are somewhat relative. For instance, the specific temperature for a particular desorption step to a degree is dependent upon the specific temperatures of the adsorption and any preceding desorption steps, as well as upon the character of the particular gas mixture being processed.

However, the temperature ranges are substantially exact and it should be noted that where a temperature within a particular range is called for, the range should be considered as exact even though the operation of the process may result in a constantly increasing temperature within that range. In this regard, it may be suitable, for instance, to conduct a desorption step with a constant gradient of temperature within a particular range, or it may be desirable to hold the temperature constant at a particular level within that range for a substantial interval of time. Obviously, the important requirement in desorption is that the differentials of temperature and time be so correlated that change from one phase of the process to the succeeding phase may be accomplished when the composition of the effluent gas is appropriate therefor.

To summarize the temperature limitations, it has been found highly advantageous for the concentration of propylene in propylene-propane mixtures to conduct the operations within temperature ranges conforming to the following outline:

| | °C. |
|---|---|
| Adsorption in the primary adsorber at | −10 to 30 |
| Desorption of first (propane-rich) fraction from the primary adsorber at | 35 to 50 |
| Desorption of second (mixed) fraction from the primary adsorber at | 35 to 70 |
| Desorption of third (propylene-rich) fraction from the primary adsorber at | 75 to 150 |
| Adsorption of third (propylene-rich) primary adsorber fraction in secondary adsorber at | −10 to 30 |
| Desorption of first (propane-rich) fraction from secondary adsorber at | 35 to 65 |
| Desorption of second (propylene) fraction | 70 to 150 |

I claim:

1. A method for separating normally gaseous olefins and gaseous paraffins from a gaseous mixture comprising the same by means of a silica gel adsorbent at atmospheric pressure, said method comprising contacting said mixture with a first bed of said adsorbent maintained at a temperature in the range of about −10° C. to 30° C. and adsorbing on said gel substantially all of said olefins and paraffins, subsequently increasing the temperature of said bed to about 40° C. whereby to desorb paraffin and withdrawing the paraffin thus liberated, further increasing the temperature of said bed to about 60° C. whereby to desorb a mixture of paraffin and olefin and withdrawing the gas mixture thus liberated, subsequently further increasing the temperature of said bed to about 145° C. whereby to desorb a gas containing substantially all olefin remaining in said bed, withdrawing the olefin-rich gas thus liberated and passing said olefin-rich gas into a second bed of silica gel, said second bed being maintained at a temperature of about −10° C. to 30° C., thereafter increasing the temperature of said second bed to about 40° C. whereby to desorb paraffin, withdrawing and collecting the paraffin thus liberated, further increasing the temperature of said second bed to about 145° C., whereby to desorb all olefin remaining therein, and withdrawing the thus liberated substantially pure olefin.

2. Method for the separation of propylene from gaseous mixtures containing about 2–75% propylene, the remainder being substantially all propane, said method comprising the steps of adsorbing the proplyene and propane of said mixture on silica gel maintained at a temperature not exceeding about 30° C., thereafter liberating and withdrawing from the gel substantially pure propane by increasing the temperature of the gel to within the range of about 35° C. to 50° C., then liberating and withdrawing from the gel most of the propane remaining therein along with some of the adsorbed propylene by increasing the temperature of the gel to within the range of about 55° C. to 70° C., and finally increasing the temperature of the gel to within the range of about 75° C. to 150° C. until substantially all of the remaining adsorbed propylene is liberated as a gas fraction rich in propylene.

3. Process as defined in claim 2 wherein the proplyene-rich gas fraction is subjected to a second adsorption-desorption fractionation treatment to produce substantially pure propylene.

4. Method for separating normally gaseous olefins from gas mixtures containing from about 2% to 75% of an olefin component and from about 25% to 98% of second normally gaseous component comprising gas selected from the group consisting of paraffins, nitrogen, carbon monoxide, carbon dioxide, and hydrogen, said method comprising the steps of adsorbing substantially all of the olefin component and a portion of the second component contained in said mixture on a first adsorbent bed of silica gel maintained at a temperature of not more than about 10° C., subsequently increasing the temperature of said bed to within the range of 35° C. to 50° C. and withdrawing from said gel a first fraction of gas comprising substantially pure second compenent liberated by the thus warmed bed, further increasing the temperature of said bed to about 60° C. and withdrawing from said gel a second fraction of gas comprising a mixture of the two components liberated by the increase in the temperature of the bed, further gradually increasing the temperature of said bed until the concentration of the olefin component in the effluent reaches a minimum of about 70 per cent by volume, thereafter gradually increasing the temperature of said bed to about 145° C. and withdrawing the gas liberated during the last-mentioned temperature-increasing step as a third gas fraction comprising a gas rich in olefin component, adsorbing said olefin-component-rich third gas fraction on a second adsorbent bed of silica gel maintained at a temperature not exceeding about 10° C., subsequently increasing the temperature of said bed to within the range of about 35° C. to 50° C. and withdrawing a fourth fraction of gas rich in the second component, and finally gradually increasing the temperature of said second bed to about 145° C. and withdrawing from said second bed a fifth gas fraction comprising substantially pure olefin component liberated by said last-mentioned increase.

5. A silica gel adsorption method for separating, at atmospheric pressure, propylene and propane from a commercial gas mixture containing about 60% propylene and about 40% propane, said method comprising the steps of adsorbing substantially all of the propylene and propane contained in said mixture on a first adsorbent bed of silica gel maintained at a temperature in the range of −5° C. to 5° C., subsequently increasing the temperature of said bed to within the range of about 35° C. to 50° C. and withdrawing from said gel a first fraction of gas comprising substantially pure propane liberated by the thus warmed bed, further increasing the temperature of said bed to about 60° C. and withdrawing from said gel a second fraction of gas comprising a mixture of propane and propylene liberated by the further increase in the temperature of the bed, further gradually increasing the temperature of said bed and withdrawing effluent gas from the bed until the concentration of propylene in the effluent reaches a minimum of about 70 per cent by volume, thereafter finally gradually increasing the temperature of said bed to about 145° C. and withdrawing the gas liberated during the final temperature increasing step as a third gas fraction comprising a gas rich in propylene, adsorbing said propylene-rich third gas fraction on a second adsorbent bed of silica gel maintained at a temperature in the range of —10° C. to 30° C., subsequently increasing the temperature of said second bed to within the range of 35° to 50° C. and withdrawing a fourth fraction of gas rich in propane, and thereafter gradually increasing the temperature of said second bed to about 145° C. and withdrawing from said second bed a fifth gas fraction comprising substantially pure propylene liberated by the last-mentioned temperature increase.

6. Method as defined in claim 4 wherein said normally gaseous olefin component consists of propylene, and said second normally gaseous component is a mixture consisting of propane, carbon dioxide, carbon monoxide, hydrogen and nitrogen.

7. Method as defined in claim 6 wherein the gas mixture of the olefin component and the second component contains a saturating amount of water vapor.

WILLIAM A. PARKS.

References Cited in the file of this patent

UNITED STATES PATENTS

| Number | Name | Date |
| --- | --- | --- |
| 1,865,422 | Askenasy | July 5, 1932 |
| 2,017,779 | Vosburgh | Oct. 15, 1935 |
| 2,083,732 | Moore et al. | June 15, 1937 |

FOREIGN PATENTS

| Number | Country | Date |
| --- | --- | --- |
| 365,092 | Great Britain | Apr. 20, 1931 |
| 525,803 | Great Britain | Sept. 4, 1940 |